(12) United States Patent
Kim et al.

(10) Patent No.: US 8,218,607 B2
(45) Date of Patent: Jul. 10, 2012

(54) DATA DETECTION FOR CODES WITH NON-UNIFORM SPREADING FACTORS

(75) Inventors: Younglok Kim, Seoul (KR); Jung-Lin Pan, Smithtown, NY (US); Ariela Zeira, Huntington, NY (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 363 days.

(21) Appl. No.: 12/549,959

(22) Filed: Aug. 28, 2009

(65) Prior Publication Data

US 2010/0020856 A1  Jan. 28, 2010

Related U.S. Application Data

(63) Continuation of application No. 11/962,779, filed on Dec. 21, 2007, now Pat. No. 7,596,171, which is a continuation of application No. 10/834,321, filed on Apr. 28, 2004, now Pat. No. 7,313,165.

(51) Int. Cl.
*H04B 1/707* (2011.01)
(52) U.S. Cl. ........................................... 375/150
(58) Field of Classification Search .................. 375/142, 375/150, 260, 267, 347
See application file for complete search history.

(56) References Cited

U.S. PATENT DOCUMENTS

| | | | |
|---|---|---|---|
| 5,970,060 A | 10/1999 | Baier et al. | |
| 6,307,867 B1 | 10/2001 | Roobol et al. | |
| 6,341,125 B1 | 1/2002 | Hong et al. | |
| 6,463,097 B1 | 10/2002 | Held et al. | |
| 6,934,323 B2 | 8/2005 | Hara | |
| 6,956,892 B2 | 10/2005 | Ylitalo | |
| 7,003,019 B2 | 2/2006 | Zeira | |
| 7,099,377 B2 | 8/2006 | Berens et al. | |
| 7,386,076 B2 * | 6/2008 | Onggosanusi et al. | ....... 375/347 |
| 2001/0053178 A1 | 12/2001 | Yano et al. | |
| 2002/0057730 A1 | 5/2002 | Karlsson et al. | |
| 2002/0176392 A1 | 11/2002 | Reznik | |
| 2003/0021249 A1 | 1/2003 | Kim et al. | |

FOREIGN PATENT DOCUMENTS

| | | |
|---|---|---|
| GB | 2359966 | 1/2000 |
| GB | 2366973 | 3/2002 |
| JP | 2000-068898 | 3/2000 |
| JP | 2000-188563 | 7/2000 |

(Continued)

OTHER PUBLICATIONS

Benvenuto et al., "Joint Detection with Low Computational Complexity for Hybrid TD-CDMA Systems," IEEE Journal on Selected Areas in Communications, vol. 19, No. 1, Jan. 2001 pp. 245-253.

(Continued)

*Primary Examiner* — Kevin Kim
(74) *Attorney, Agent, or Firm* — Volpe and Koenig, P.C.

(57) ABSTRACT

A plurality of communication signals is received. Each communication signal has an associated code. At least two of the communication signals has a different spreading factor. The associated codes have a scrambling code period. A total system response matrix has blocks. Each block has one dimension of a length M and another dimension of a length based on in part M and the spreading factor of each communication. M is based on the scrambling code period. Data of the received plurality of communication signals is received using the constructed system response matrix.

18 Claims, 3 Drawing Sheets

FOREIGN PATENT DOCUMENTS

| | | |
|---|---|---|
| JP | 2001-016134 | 1/2001 |
| JP | 2001-111456 | 4/2001 |
| JP | 2003-218738 | 7/2003 |
| WO | 99/14870 | 3/1999 |
| WO | 01/20801 | 3/2001 |
| WO | 01/22610 | 3/2001 |
| WO | 01/43302 | 6/2001 |
| WO | 01/50659 | 7/2001 |

OTHER PUBLICATIONS

Karimi et al., "A Novel and Efficient Solution to Block-Based Joint-Detection Using Approximate Cholesky Factorization," IEEE International Symposium on Personal, Indoor and Mobile Radio Communications, vol. 3, 1998, pp. 1340-1345.

Karimi, "Efficient Multi-Rate Multi-User Detection for the Asynchronous WCDMA Uplink", Vehicular Technology Conference, 1999, IEEE vol. 1, Sep. 19, 2001, pp. 593-597.

Klein et al., "Linear Unbiased Data Estimation in Mobile Radio Systems Applying CDMA," IEEE Journal on Selected Areas in Communications, vol. 11, No. 7, Sep. 1193, pp. 1058-1066.

Klein et al., "Zero Forcing and Minimum Mean-Square-Error Equalization for Multiuser Detection in Code-Division Multiple-Access Channels," IEEE Transactions on Vehicular Technology, US, IEEE Inc. New York, vol. 45, No. 2, May 1, 1996 pp. 276-287.

Mayer et al., "Realtime Feasibility of Joint Detection CDMA," EPMCC, European Personal Mobile Communications Conference Together with Kommunikation, vol. 145, No. 145, 1997, pp. 245-25.

* cited by examiner

DATA DETECTION FOR CODES WITH NON-UNIFORM SPREADING FACTORS

CROSS REFERENCE TO RELATED APPLICATIONS

This application is a continuation of U.S. patent application Ser. No. 11/962,779, filed Dec. 21, 2007 now U.S. Pat. No 7,596,171, which is a continuation of U.S. patent application Ser. No. 10/834,321, filed Apr. 28, 2004, now Issued U.S. Pat. No. 7,313,165 on Dec. 25, 2007, which claims the benefit of U.S. patent application Ser. No. 10/064,307, filed Jul. 1, 2002, now Issued U.S. Pat. No. 6,741,653 on May 24, 2004, which are incorporated by reference as if fully set forth.

BACKGROUND

This invention generally relates to wireless code division multiple access communication systems. In particular, the invention relates to data detection of communications having non-uniform spreading factors in such systems.

In code division multiple access (CDMA) communication systems, multiple communications may be simultaneously sent over a shared frequency spectrum. Each communication is distinguished by the code used to transmit the communication. Data symbols of a communication are spread using chips of the code. The number of chips used to transmit a particular symbol is referred to as the spreading factor. To illustrate, for a spreading factor of sixteen (16), sixteen chips are used to transmit one symbol. Typical spreading factors (SF) are 16, 8, 4, 2 and 1 in TDD/CDMA communication systems.

In some CDMA communication systems to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

One approach to receive the multiple communications transmitted within the shared spectrum is joint detection. In joint detection, the data from the multiple communications is determined together. The joint detector uses the, known or determined, codes of the multiple communications and estimates the data of the multiple communications as soft symbols. Some typical implementations for joint detectors use zero forcing block linear equalizers (ZF-BLE) applying Cholesky or approximate Cholesky decomposition or fast Fourier transforms.

These implementations are typically designed for all the communications to have the same spreading factor. Simultaneously handling communications having differing spreading factors is a problem for such systems.

Accordingly, it is desirable to be able to handle differing spreading factors in joint detection.

SUMMARY

A plurality of communication signals is received. Each communication signal has an associated code. At least two of the communication signals has a different spreading factor. The associated codes have a scrambling code period. A total system response matrix has blocks. Each block has one dimension of a length M and another dimension of a length based on in part M and the spreading factor of each communication. M is based on the scrambling code period. Data of the received plurality of communication signals is received using the constructed system response matrix.

BRIEF DESCRIPTION OF THE DRAWING(S)

DETAILED DESCRIPTION OF THE PREFERRED EMBODIMENT(S)

The embodiments of the invention can generally be used with any type of CDMA system, such as a TDD/CDMA, TDMA/CDMA or frequency division duplex/CDMA communication system, as well as other types of communication systems.

Figure 1:
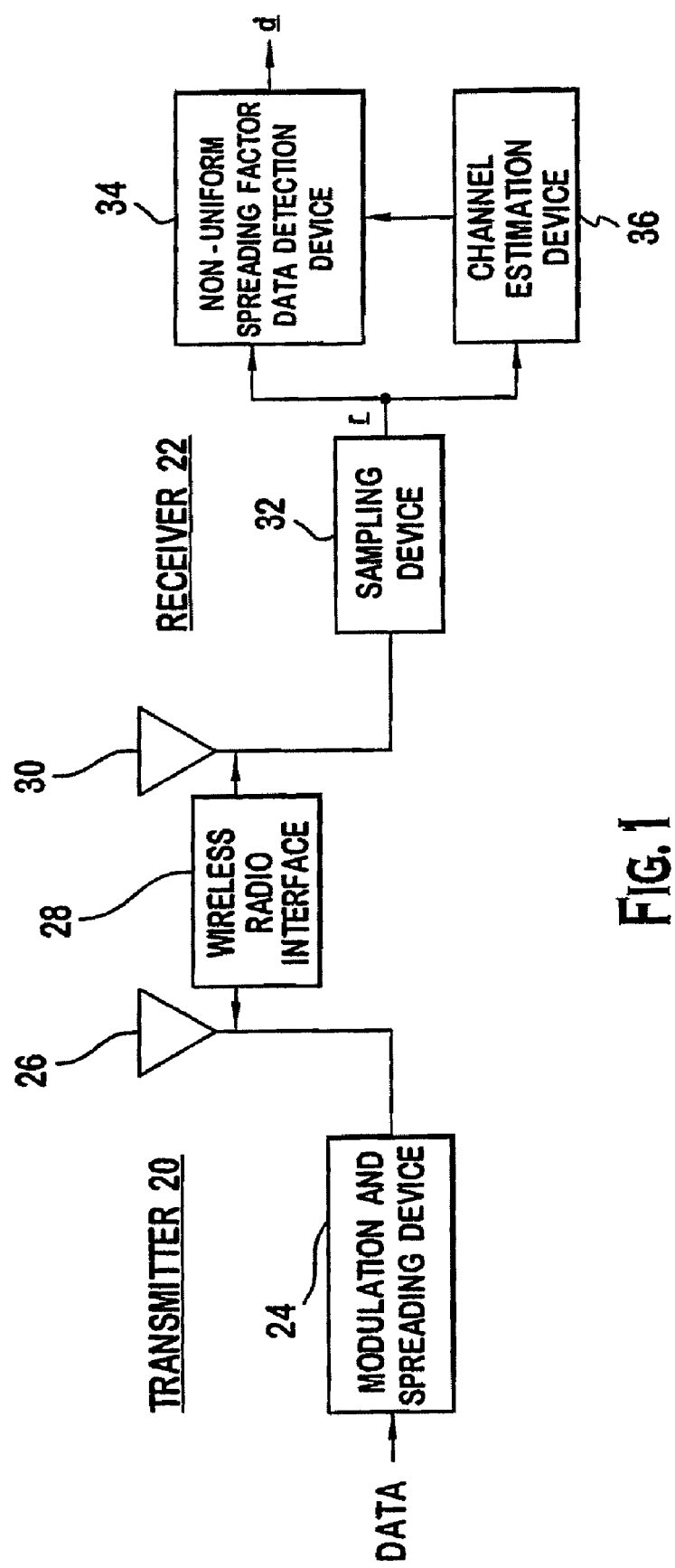
FIG. 1 is an embodiment of a non-uniform spreading factor communication system.

FIG. 1 illustrates an embodiment of a non-uniform spreading factor communication system. A transmitter 20 and a receiver 22 are shown in FIG. 1. The transmitter 20 may be located at a user equipment or multiple transmitting circuits 20 may be located at the base station. The receiver 22 may be located at either the user equipment, base station or both, although the preferred use of the receiver 22 is for use at a base station for reception of uplink communications.

Data symbols to be transmitted to the receiver 22 are processed by a modulation and spreading device 24 at the transmitter 20. The modulation and spreading device 24 spreads the data with the codes and at spreading factors assigned to the communications carrying the data. The communications are radiated by an antenna 26 or antenna array of the transmitter 20 through a wireless radio interface 28.

At the receiver 22, the communications, possibly along with other transmitters' communications, are received at an antenna 30 or antenna array of the receiver 22. The received signal is sampled by a sampling device 32, such as at the chip rate or at a multiple of the chip rate, to produce a received vector, r. The received vector is processed by a channel estimation device 36 to estimate the channel impulse responses for the received communications. The channel estimation device 36 may use a training sequence in the received communication, a pilot signal or another technique to estimate the impulse responses. A non-uniform spreading factor data detection device 34 uses the codes of the received communications and the estimated impulse responses to estimate soft symbols, $\bar{d}$, of the spread data.

Figure 2:
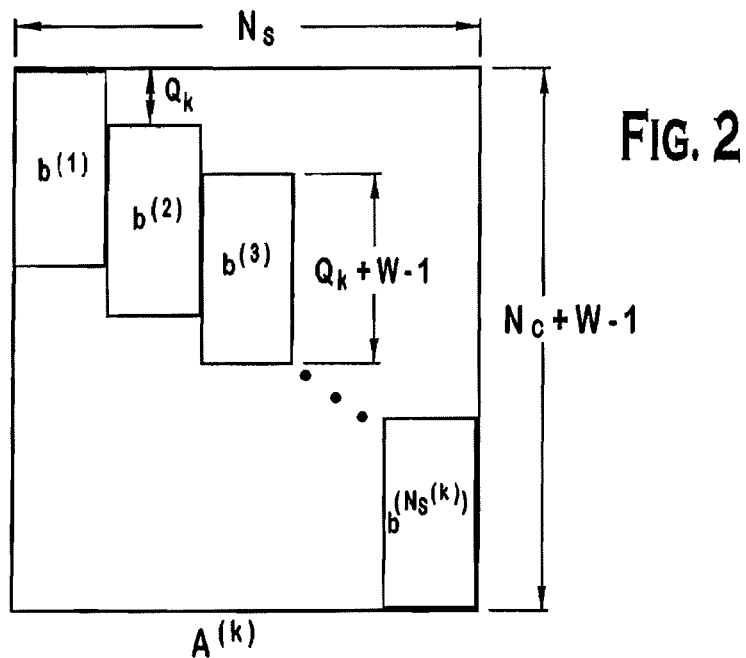
FIG. 2 is an illustration of a system response matrix for a $k^{th}$ communication.
Figure 3:
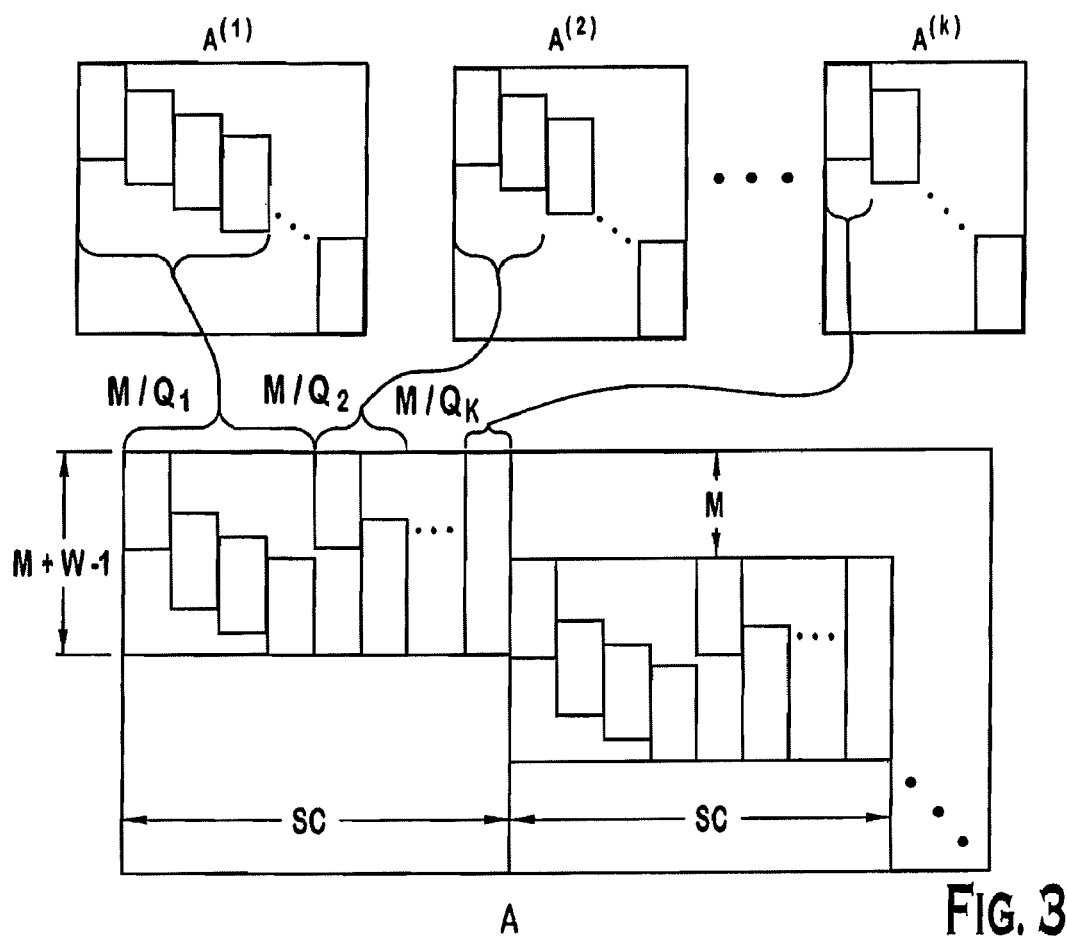
FIG. 3 is an illustration of constructing a total system response matrix.
Figure 4:
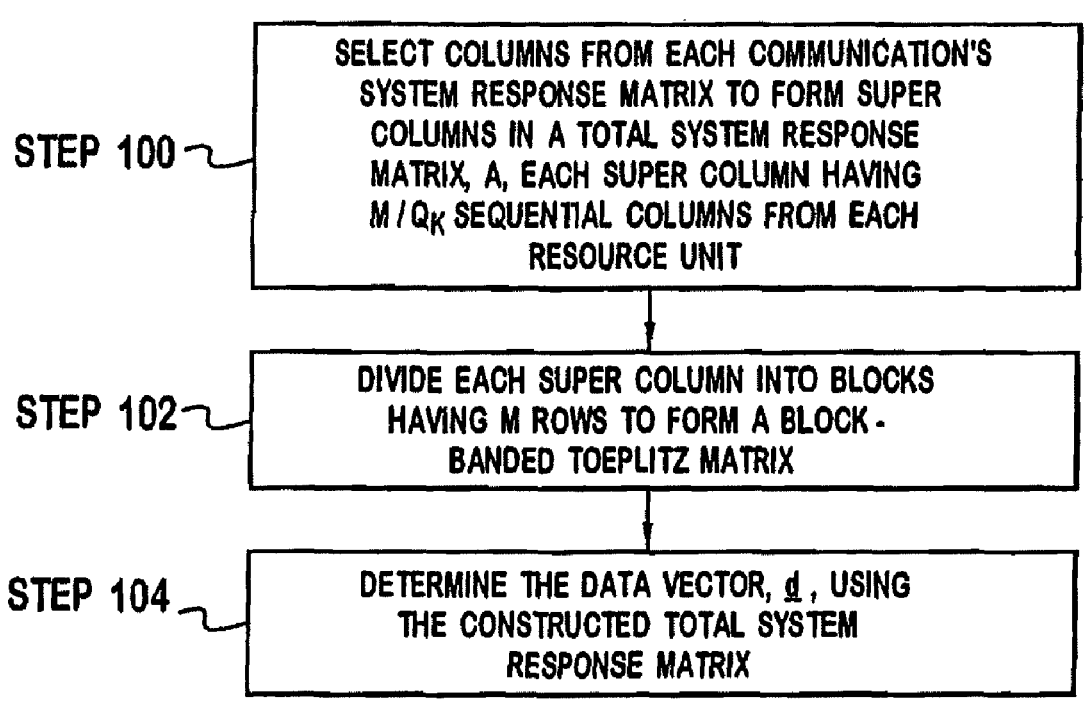
FIG. 4 is a flow chart of detecting data from communications having non-uniform spreading factors.

Data detection for codes having non-uniform spreading factors is illustrated in FIGS. 2 and 3 and is described with the flow chart of FIG. 4. A number, K, communications are transmitted during an observation interval. In a TDD/CDMA communication system, an observation interval is typically one data field of a communication burst. However, in TDD/CDMA as well as other CDMA communication systems, other size observation intervals may be used, such as the period of the scrambling codes.

The samples of the combined received K communications are collected over the observation interval as a received vector, r. The length in chips of r is the number of chips transmitted in the observation interval of each communication, $N_c$, added to the length of the channel impulse response, W, less one, $(N_c+W-1)$.

A $k^{th}$ communication of the K communications as transmitted can be represented as $\underline{x}^{(k)}$. An $i^{th}$ chip within a symbol boundary of each symbol is defined as $x_i^{(k)}$ and is per Equation 1.

$$x_i^{(k)} = \sum_{n=1}^{N_s^{(k)}} d_n^{(k)} \underline{v}_i^{(n,k)} \qquad \text{Equation 1}$$

$N_s^{(k)}$ is the number of symbols of the $k^{th}$ communication in the observation interval. $d_n^{(k)}$ is the symbol value of an $n^{th}$ symbol of the $N_s^{(k)}$ symbols. $\underline{v}^{(n,k)}$ is the portion of the code sequence of the $k^{th}$ communication within the $n^{th}$ symbol boundary ($\underline{v}^{(n,k)}$ is zero outside the $n^{th}$ symbol boundary). $v_i^{(n,k)}$ is the $i^{th}$ chip of the portion of the code sequence within the symbol boundary ($v_i^{(n,k)}$ is zero except for the $i^{th}$ chip within the $n^{th}$ symbol boundary).

Equation 1 can be extended to a matrix equation per Equation 2.

$$\underline{x}^{(k)} = V^{(k)} \underline{d}^{(k)} \qquad \text{Equation 2}$$

$V^{(k)}$ is a spreading matrix for communication k and has $N_s^{(k)}$ columns and $N_c$ rows. An $n^{th}$ column of $V^{(k)}$ is $\underline{v}^{(n,k)}$.

After transmission through the wireless channel, $\underline{x}^{(k)}$ experiences a channel impulse response $\underline{h}^{(k)}$. $\underline{h}^{(k)}$ is W chips in length. $h_j^{(k)}$ is a $j^{th}$ chip of $\underline{h}^{(k)}$. Ignoring noise, the contribution, $\underline{r}^{(k)}$ of communication k to the received vector, $\underline{r}$, is per Equation 3.

$$\underline{r}^{(k)} = \sum_{j=1}^{W} \underline{h}_j^{(k)} \underline{x}_{i-j+1}^{(k)} \qquad \text{Equation 3}$$

$$= \sum_{j=1}^{W} \underline{h}_j^{(k)} \sum_{n=1}^{N_s^{(k)}} \underline{d}_n^{(k)} \underline{v}_{i-j+1}^{(n,k)}$$

$$= \sum_{n=1}^{N_s^{(k)}} \underline{d}_n^{(k)} \sum_{j=1}^{W} \underline{h}_j^{(k)} \underline{v}_{i-j+1}^{(n,k)}$$

In matrix form, Equation 3 is per Equation 4.

$$\underline{r}^{(k)} = H^{(k)} V^{(k)} \underline{d}^{(k)} \qquad \text{Equation 4}$$

$H^{(k)}$ is the channel response matrix for communication k and has $N_c$ columns and $(N_c+W-1)$ rows. The support of an $i^{th}$ column of $H^{(k)}$ is the channel impulse response $\underline{h}^{(k)}$. The first element of the support for an $i^{th}$ column of $H^{(k)}$ is the $i^{th}$ element of that column.

For each communication k, a system transmission matrix $A^{(k)}$ can be constructed per Equation 5.

$$A^{(k)} = H^{(k)} V^{(k)} \qquad \text{Equation 5}$$

FIG. 2 is an illustration of a system response matrix $A^{(k)}$. Each column of the matrix corresponds to one data symbol of the communication. As a result, the matrix has $N_s^{(k)}$ columns. Each $i^{th}$ column has a block $b^{(i)}$ of non-zero elements. The number of non-zero elements is determined by adding the $k^{th}$ communication's spreading factor, $Q_k$, and the impulse response length, W, minus 1, ($Q_k+W-1$). The left-most column has a block $b^{(1)}$ starting at the top of the column. For each subsequent column, the block starts $Q_k$ chips lower in the matrix. The resulting overall height of the matrix in chips is ($N_c+W-1$).

A total system transmission matrix can be formed by combining each communication's system response matrix $A^{(k)}$, such as per Equation 6.

$$A = [A^{(1)}, A^{(2)}, \ldots, A^{(K)}] \qquad \text{Equation 6}$$

However, such a total system response matrix A would have an extremely large bandwidth. To reduce the matrix bandwidth, a block-banded toeplitz matrix is constructed, having the columns of the matrix of Equation 6 rearranged.

The height, (M+W−1), of blocks in the matrix is based on the period of the scrambling code. In many communication systems, the scrambling code repeats over a specified number of chips. To illustrate for a TDD/CDMA communication system, the scrambling code repeats after 16 chips (M=16).

A maximum spreading code of the K communications or a maximum spreading code of the communication system is referred to as $Q_{MAX}$. To illustrate, a typical TDD/CDMA communication system has a maximum spreading factor of 16 and a receiver in such a system receives communications having spreading factors of 4 and 8. In such a system, $Q_{MAX}$ may be 16 (the maximum of the system) or 8 (the maximum of the received communications).

If the scrambling code period is not an integer multiple of $Q_{MAX}$, a multiple of the period may be used instead of M for constructing the blocks. To illustrate, if $Q_{MAX}$ is 16 and the period is 24, three times the period (48 chips) may be used, since it is evenly divisible by 16 and 24.

Initially, columns from $A^{(1)}, A^{(2)}, \ldots, A^{(K)}$ are selected to construct the A matrix based on each k communication's spreading factor. For the first columns of the A matrix, $M/Q_1$ of the first columns of $A^{(1)}$ are selected, as shown in FIG. 3. Using a second of the K matrices $A^{(2)}$, $M/Q_2$ columns are selected. This procedure is repeated for the other K matrices, $A^{(3)}, \ldots, A^{(K)}$. All of the K matrices first columns become a super column in the total system response matrix, A, having a number of columns, SC, per Equation 7, (step 100).

$$SC = \sum_{k=1}^{K} M/Q_k \qquad \text{Equation 7}$$

A second super column is constructed in the same manner by selecting the next columns in the $A^{(1)}, A^{(2)}, \ldots, A^{(K)}$ matrices. The other super columns are constructed in the same manner.

Although this illustration selects columns from the matrices in numerical order, $A^{(1)}, A^{(2)}, \ldots, A^{(K)}$, the order of the matrices can vary. Although the resource units can be arranged in any order and still achieve a reduced bandwidth, by placing resource units transmitted with the lowest spreading factors at the exterior of each block, the bandwidth may be further reduced. However, in some implementations, the potential reduction in bandwidth may not outweigh the added complexity for reordering the K communications.

Each super column is divided into blocks having M rows, as per Equation 8, (step 102).

$$A = \begin{bmatrix} B_1 & 0 & \ldots & 0 & 0 \\ \vdots & B_1 & \ddots & \vdots & \vdots \\ B_L & \vdots & \ddots & 0 & \vdots \\ 0 & B_L & \ddots & B_1 & 0 \\ \vdots & 0 & \ddots & \vdots & B_1 \\ 0 & \vdots & \ddots & B_L & \vdots \\ 0 & 0 & \ldots & 0 & B_L \end{bmatrix} \qquad \text{Equation 8}$$

As shown in Equation 8, the non-zero elements of each subsequent column is M rows (one block) lower in the matrix. The number of non-zero blocks in each column is L, which is per Equation 9.

$$L = \left\lceil \frac{M+W-1}{M} \right\rceil \quad \text{Equation 9}$$

The data detection can be modeled per Equation 10.

$$\underline{r} = A\underline{d} + \underline{n} \quad \text{Equation 10}$$

where $\underline{n}$ is the noise vector. A zero-forcing solution to Equation 10 is per Equations 11 and 12.

$$A^H \underline{r} = R\underline{d} \quad \text{Equation 11}$$

$$R = A^H A \quad \text{Equation 12}$$

where $(\cdot)^H$ is a complex conjugate transpose operation (Hermetian).

A minimum mean square error solution to Equation 10 is per Equations 13 and 14.

$$A^H \underline{r} = R\underline{d} \quad \text{Equation 13}$$

$$R = A^H A + \sigma^2 I \quad \text{Equation 14}$$

where $\sigma^2$ is the noise variance and I is the identity matrix.

To solve either Equation 11 or 13 in a brute force approach, a matrix inversion of R, $R^{-1}$, is required. Using the A matrix of Equation 8, the structure of the R matrix of either Equation 12 or 14 is per Equation 15.

$$R = \begin{bmatrix} R_0 & R_1 & R_2 & R_3 & R_{L-1} & 0 & 0 & 0 & 0 & 0 & 0 & 0 \\ R_1^H & R_0 & R_1 & R_2 & R_3 & R_{L-1} & 0 & 0 & 0 & 0 & 0 & 0 \\ R_2^H & R_1^H & R_0 & R_1 & R_2 & R_3 & R_{L-1} & 0 & 0 & 0 & 0 & 0 \\ R_3^H & R_2^H & R_1^H & R_0 & R_1 & R_2 & R_3 & R_{L-1} & 0 & 0 & 0 & 0 \\ R_{L-1}^H & R_3^H & R_2^H & R_1^H & R_0 & R_1 & R_2 & R_3 & R_{L-1} & 0 & 0 & 0 \\ 0 & R_{L-1}^H & R_3^H & R_2^H & R_1^H & R_0 & R_1 & R_2 & R_3 & R_{L-1} & 0 & 0 \\ 0 & 0 & R_{L-1}^H & R_3^H & R_2^H & R_1^H & R_0 & R_1 & R_2 & R_3 & R_{L-1} & 0 \\ 0 & 0 & 0 & R_{L-1}^H & R_3^H & R_2^H & R_1^H & R_0 & R_1 & R_2 & R_3 & R_{L-1} \\ 0 & 0 & 0 & 0 & R_{L-1}^H & R_3^H & R_2^H & R_1^H & R_0 & R_1 & R_2 & R_3 \\ 0 & 0 & 0 & 0 & 0 & R_{L-1}^H & R_3^H & R_2^H & R_1^H & R_0 & R_1 & R_2 \\ 0 & 0 & 0 & 0 & 0 & 0 & R_{L-1}^H & R_3^H & R_2^H & R_1^H & R_0 & R_1 \\ 0 & 0 & 0 & 0 & 0 & 0 & 0 & R_{L-1}^H & R_3^H & R_2^H & R_1^H & R_0 \end{bmatrix} \quad \text{Equation 15}$$

As shown in Equation 15, the R matrix is block-banded and Toeplitz. As a result, solving either Equation 11 or 13 for $\underline{d}$ can be readily implemented using a block Cholesky or approximate Cholesky decomposition, (step 104). Alternately, using a circulant approximation of the R matrix of Equation 9, a block fast Fourier transform approach can be used to solve for $\underline{d}$, (step 104).

What is claimed is:

1. A wireless communication apparatus comprising:
   a receiving component configured to receive a combined plurality of wireless communication signals; and
   a processing component configured to:
   construct a system response matrix for each of the wireless communication signals;
   re-arrange the system response matrices to create a block-banded Toeplitz matrix;
   solve the block-banded Toeplitz matrix to calculate a system correlation matrix; and
   detect data in each of the system response matrices based on the system correlation matrix.

2. The apparatus of claim 1 wherein the processing component is configured to detect data by using one of a block Cholesky decomposition and an approximation Cholesky decomposition.

3. The apparatus of claim 1 wherein the processing component is configured to detect data by using a circulant approximation of the system correlation matrix and a fast Fourier transform approach.

4. The apparatus of claim 1 wherein the processing component is configured to solve the block-banded Toeplitz matrix by using a zero-forcing solution.

5. The apparatus of claim 1 wherein the processing component is configured to solve the block-banded Toeplitz matrix by using a minimum mean square error solution.

6. The apparatus of claim 1 wherein the processing component is configured to re-arrange the system response matrices to create a block-banded Toeplitz matrix by:
   selecting first columns of the block-banded Toeplitz matrix based on a first $M/Q_k$ columns of the system response matrices, where M is based on a scrambling code period of a communication represented by the respective system response matrix, $Q_k$ is the spreading factor of a $k^{th}$ communication signal of the plurality of wireless communication signals, and wherein the first $M/Q_k$ columns of each system response matrix form a first super-column in the block-banded Toeplitz matrix;
   creating a second super column of the block-banded Toeplitz matrix beginning M rows below the first super column based on the second $M/Q_k$ columns of the system response matrices; and
   continuing to create super columns of the block-banded Toeplitz matrix, each subsequent super column beginning M rows below a previous super column until all columns of the system response matrices are added to the block-banded Toeplitz matrix.

7. The apparatus of claim 6, wherein the processing component is configured to use a value for M based on a value of a multiple of a scrambling code period, wherein the multiple of the scrambling code period is evenly divisible by one of the maximum spreading factor of a system and a maximum spreading factor at which the system is receiving communications.

8. The apparatus of claim 1 configured as a base station.

9. The apparatus of claim 1 configured as a user equipment.

10. A method of wireless communication processing comprising:
receiving a combined plurality of wireless communication signals;
constructing a system response matrix for each of the wireless communication signals;
re-arranging the system response matrices to create a block-banded Toeplitz matrix;
solving the block-banded Toeplitz matrix to calculate a system correlation matrix; and
detecting data in each of the system response matrices based on the system correlation matrix.

11. The method of claim 10 wherein the detecting data is performed using one of a block Cholesky decomposition and an approximation Cholesky decomposition.

12. The method of claim 10 wherein the detecting data is performed using a circulant approximation of the system correlation matrix and a fast Fourier transform approach.

13. The method of claim 10 wherein the solving the block-banded Toeplitz matrix is performed using a zero-forcing solution.

14. The method of claim 10 wherein the solving the block-banded Toeplitz matrix is performed using a minimum mean square error solution.

15. The method of claim 10 wherein the re-arranging the system response matrices to create a block-banded Toeplitz matrix comprises:

selecting first columns of the block-banded Toeplitz matrix based on a first $M/Q_k$ columns of the system response matrices, where M is based on a scrambling code period of a communication represented by the respective system response matrix, $Q_k$ is the spreading factor of a $k^{th}$ communication signal of the plurality of wireless communication signals, and wherein the first $M/Q_k$ columns of each system response matrix form a first super-column in the block-banded Toeplitz matrix;
creating a second super column of the block-banded Toeplitz matrix beginning M rows below the first super column based on the second $M/Q_k$ columns of the system response matrices; and
continuing to create super columns of the block-banded Toeplitz matrix, each subsequent super column beginning M rows below a previous super column until all columns of the system response matrices are added to the block-banded Toeplitz matrix.

16. The method of claim 10 wherein the value of M is based on a value of a multiple of a scrambling code period, wherein the multiple of the scrambling code period is evenly divisible by one of the maximum spreading factor of a system and a maximum spreading factor at which the system is receiving communications.

17. The method of claim 10 performed by a base station.

18. The method of claim 10 performed by a user equipment.

* * * * *

UNITED STATES PATENT AND TRADEMARK OFFICE
CERTIFICATE OF CORRECTION

PATENT NO. : 8,218,607 B2
APPLICATION NO. : 12/549959
DATED : July 10, 2012
INVENTOR(S) : Kim et al.

Page 1 of 1

It is certified that error appears in the above-identified patent and that said Letters Patent is hereby corrected as shown below:

ON THE TITLE PAGE

At Item (63) RELATED U.S. APPLICATION DATA, page 1, right column, after "now Pat. No. 7,313,165", insert --, which is a continuation of application No. 10/064,307, filed on Jul. 1, 2002, now Pat. No. 6,741,653--.

At Item (56) OTHER PUBLICATIONS, page 2, right column, after "vol. 11, No. 7, Sep.", delete "1193" and insert --1993--.

Signed and Sealed this
Fifth Day of March, 2013

Teresa Stanek Rea
*Acting Director of the United States Patent and Trademark Office*